Nov. 5, 1940.   P. KAPITZA   2,220,524
MEANS FOR DAMPING OSCILLATIONS OF ROTATING SHAFTS
Filed Nov. 3, 1938
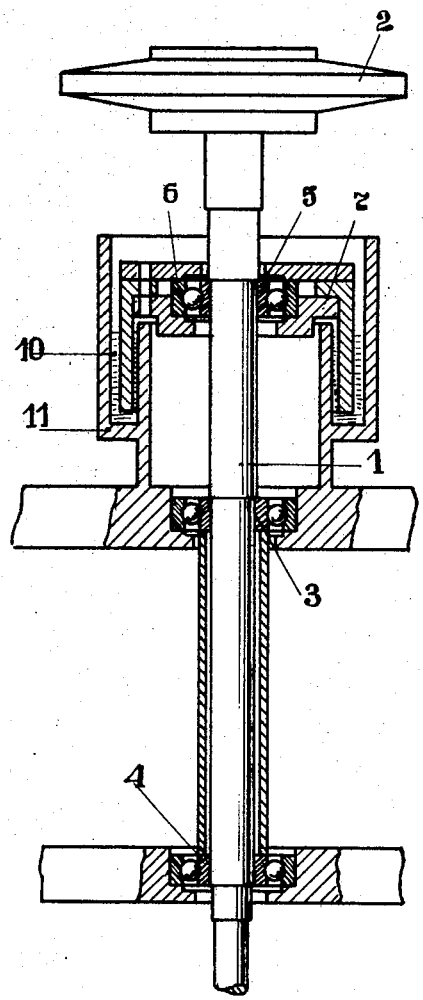
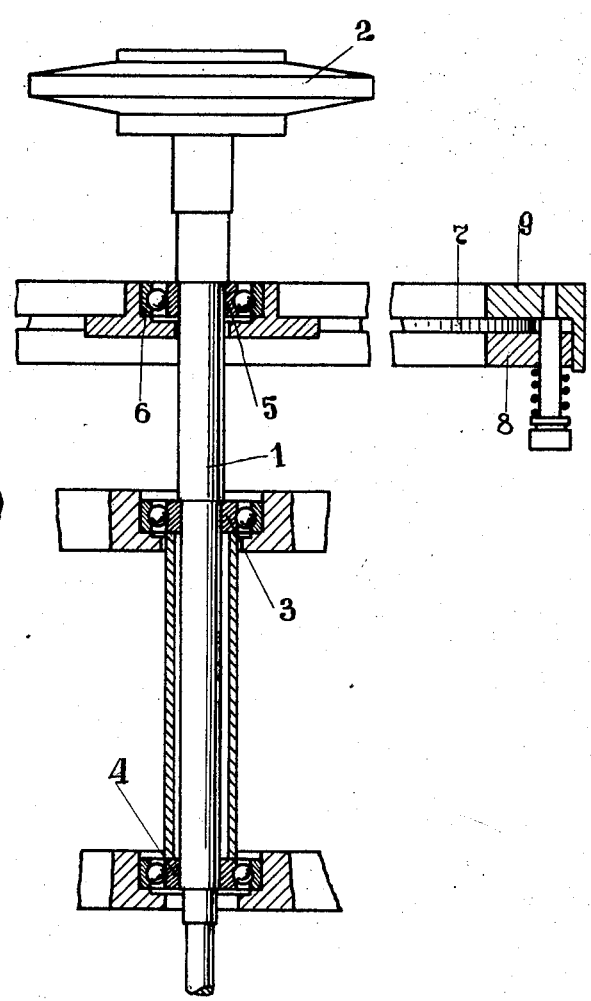
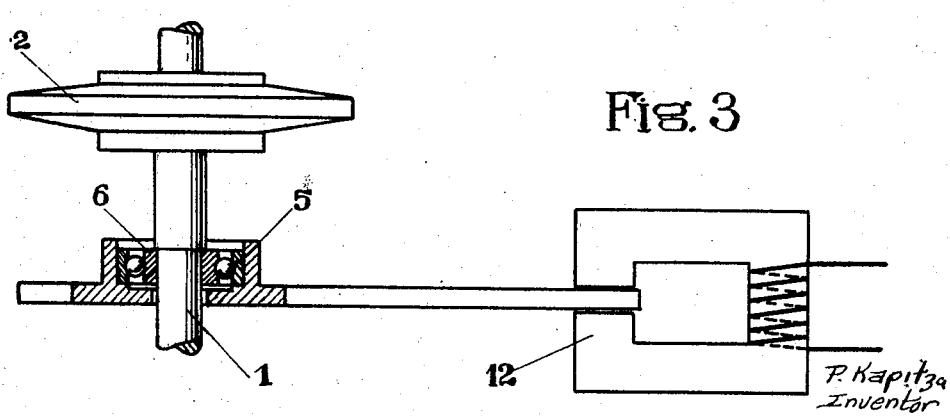
P. Kapitza
Inventor
by: Glascock Downing & Seebold
Attys.

Patented Nov. 5, 1940

2,220,524

UNITED STATES PATENT OFFICE 2,220,524

MEANS FOR DAMPING OSCILLATIONS OF ROTATING SHAFTS

Peter Kapitza, Moscow, Union of Soviet Socialist Republics

Application November 3, 1938, Serial No. 238,700
In the Union of Soviet Socialist Republics September 16, 1938

2 Claims. (Cl. 74—574)

The present invention relates to means for damping vibrations appearing above the critical speed of rapidly rotating machine shafts.

It has been found that if the number of revolutions of the shaft exceeds the critical speed, the stability of the revolving rotors in steam or gas turbines, turbo-compressors and expansion turbines of the usual construction is broken and the disturbance becomes still larger with the increased density of the medium in which the rotor revolves.

According to the invention perfect stability of the shaft can be secured by means of a special damping device arranged near the shaft which takes the form of a loosely fixed bearing so that the resulting movement induced by the influence of the reacting force which reacts in its turn in proportion to the vibrations invoked by the shaft.

In the attached drawing a few of the forms of the invention are shown in which the rotor of the turbine or any other machine revolving at a great speed is placed on the end. The invention also comprises horizontal shafts and the disposition of the rotor between two bearings.

In the drawing:

Fig. 1 is a sectional view of the damping means applied to a vertical shaft wherein a viscous liquid medium is employed.

Fig. 2 is a sectional view partly in elevation of a modified damping arrangement.

Fig. 3 is an elevational view of another type of damping means applied to a rotating shaft.

Referring to the drawing and as shown in Figs. 1 and 2 the shaft 1 has its end fixed to the rotor 2 and apart from the two bearings 3 and 4 which are rigidly fixed to the stand there is an extra bearing, preferably a ball bearing 5 with as little play as possible whose casing 6 is fixed rigidly to the holder 7. The latter as shown in Fig. 2 is clamped at several points for example in three or four places at equal distances outside or all round the circumference to the jaws 8 and 9 which have an adjustable grip that can be regulated for example by an adjustable spring. By a suitable adjustment the frictional force between the disc 7 and the jaws 8 and 9 the vibrations of the shaft 1 can be entirely damped.

Fig. 1 shows another form of the device in which the damping agent is a liquid viscous medium, oil for example.

Here the holder 7 of the bearing 5 is fixed to the cylinder 10 immersed in a circular vessel 11 filled with oil, placed concentrically round shaft 1. If the immersion of the cylindrical part 10 and the support 7 is deep enough in the oil and the vessel 11 has a suitable diameter the vibrations of the shaft 1 can be fully damped. In other words the spiral movements of the shaft caused by the vibrations are transmitted through the cylindrical part 10 to the oil and create therein frictional forces of great power resulting in the rapid suppression of the movements causing them.

Here the operation can be regulated in the first place by carefully selecting the viscosity of the oil and in the second place by altering the area of the surface of the part 10 by altering the level of the oil in the vessel.

Fig. 3 shows still another form of the device. Here the damping force is obtained owing to the large instantaneous velocity of the vibrations of the shaft interacting with the Foucault currents induced in the metal holder 7 which moves between the magnetic poles of an electromagnet 12. Three or more electro-magnets can be placed at equal distances on the circumference or one magnet with ring shaped poles can be used.

The examples given do not exhaust all the possible forms of the invention the important point being as shown above in the fixing of a damper device to the shaft consisting of a bearing which is not rigidly fixed to the stand.

I claim:

1. Apparatus for damping out vibrations of a rapidly rotating machine shaft in which the damping is produced by forces created by and reacting against the oscillations of the shaft comprising, an auxiliary bearing associated with the shaft, and means for creating damping frictional forces which increase from zero together with the growth of the auxiliary bearing oscillations consisting of an inner race associated with the bearing rigidly fixed to the shaft, an outer race for said bearing, a cylindrical body attached to the outer race of the auxiliary ball-bearing, and a vessel attached to the body of the machine filled with a viscous liquid in which the cylinder attached to the outer race of the auxiliary ball-bearing is immersed.

2. Apparatus for damping vibrations of a rapidly rotating machine shaft comprising, an auxiliary bearing having an inner part secured to said shaft, an outer part for said bearing, a cylindrical member secured to and depending from said outer bearing part, a fixed vessel encasing said cylindrical member, and a supply of viscous liquid within said vessel for creating damping frictional forces increasing along with the growth of the auxiliary bearing oscillations.

PETER KAPITZA.